Figure 3:
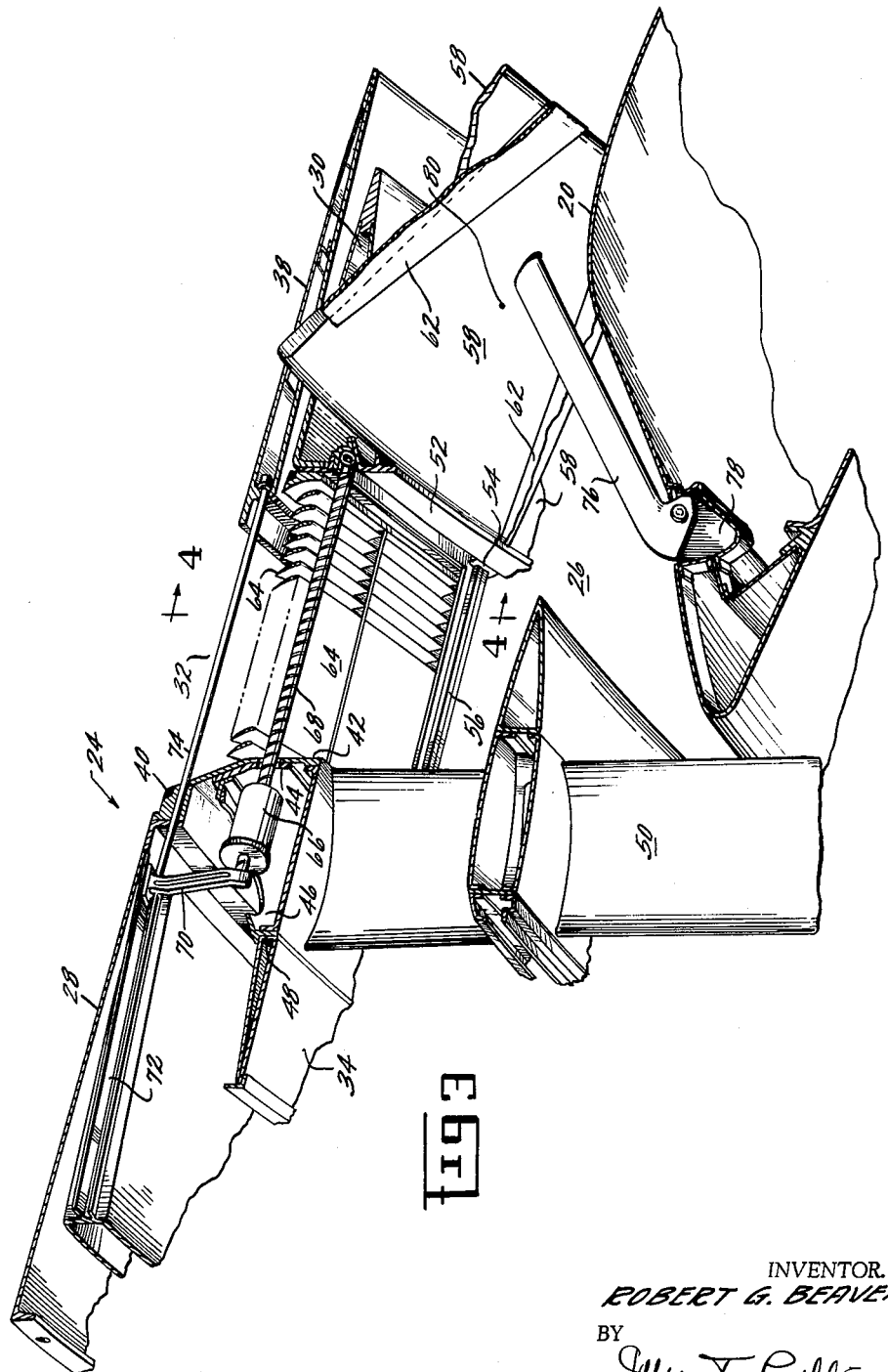

July 26, 1966        R. G. BEAVERS        3,262,270
THRUST REVERSER
Filed June 7, 1965        3 Sheets-Sheet 1
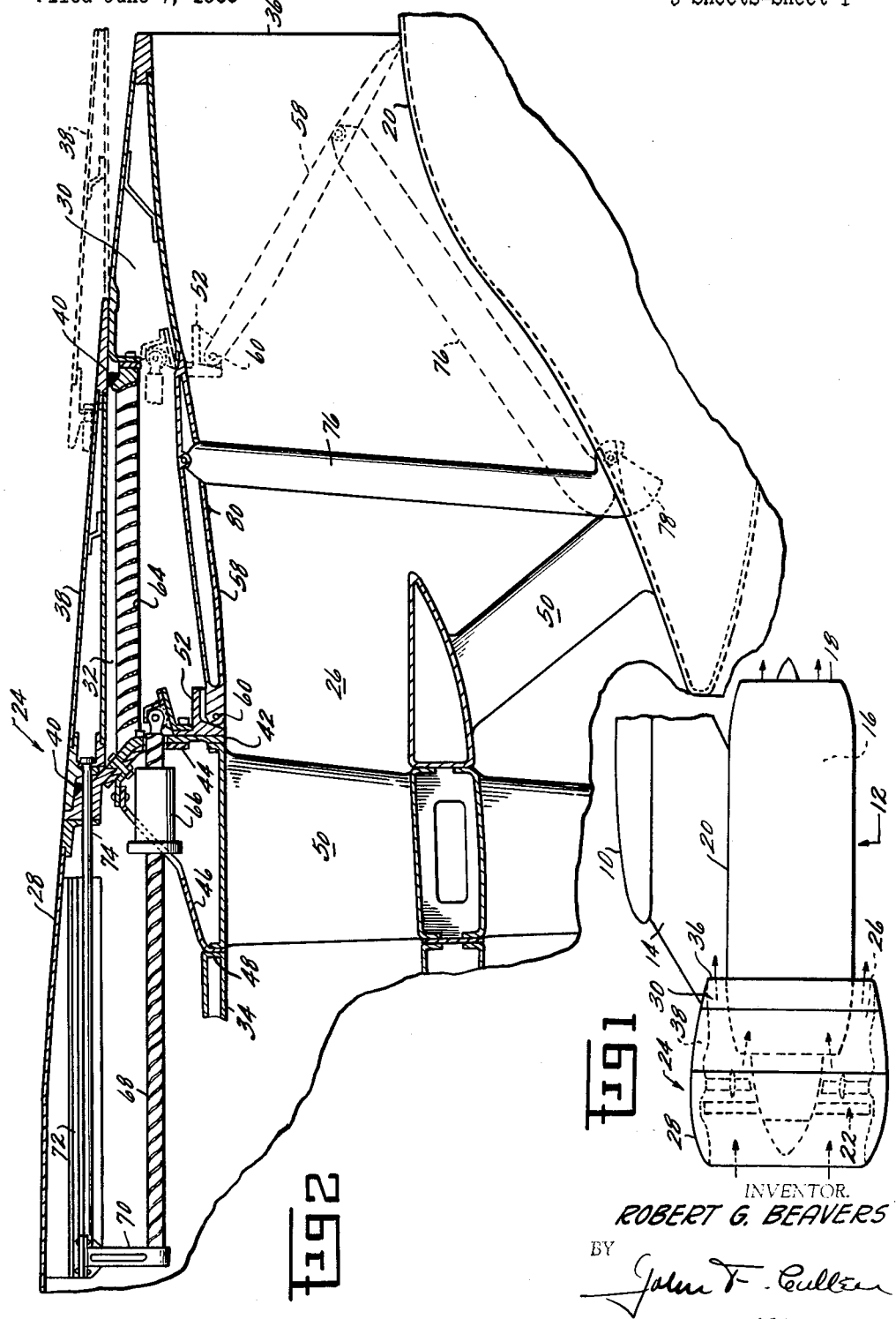
INVENTOR.
ROBERT G. BEAVERS
BY
ATTORNEY July 26, 1966 R. G. BEAVERS 3,262,270
THRUST REVERSER Filed June 7, 1965 3 Sheets-Sheet 2

INVENTOR.
ROBERT G. BEAVERS
BY
John F. Cullen
ATTORNEY

July 26, 1966  R. G. BEAVERS  3,262,270
THRUST REVERSER

Filed June 7, 1965  3 Sheets-Sheet 3

INVENTOR.
ROBERT G. BEAVERS
BY
*Jim F. Cullen*
ATTORNEY

United States Patent Office 3,262,270
Patented July 26, 1966

3,262,270
THRUST REVERSER
Robert G. Beavers, Mason, Ohio, assignor to General
Electric Company, a corporation of New York
Filed June 7, 1965, Ser. No. 462,793
14 Claims. (Cl. 60—35.54)

The present invention, a continuation-in-part of application Serial No. 445,488 filed April 5, 1965, now abandoned, relates to a thrust reverser and, more particularly, to a thrust reverser mechanism that is particularly applicable to bypass type fan engines.

With the advent of the fan engine, whether forward or aft fan, it has become necessary to supply a thrust reverser mechanism to reverse the fluid through the generally annular cross-section of the bypass duct. Because the use of fans with conventional jet engines results in larger diameter engines or cruise fans, it is desired to provide a reverser mechanism that does not add to an already large diameter. Furthemore, because the engines become large and the reversing operation must be carried out on a relatively large periphery, it becomes important that the reversing structure be lightweight and straightforward and simple in operation. The high bypass ratio turbofan of up to 8 to 1 and above, is a fan engine in which a very large quantity of the propulsive fluid is sent through the annular bypass duct. In such engines, it may be possible to reverse only the bypass flow since the flow through the jet engine whether concentric or remote is a proportion as small as 10%-15% of the total flow. Reversing efficiently only the bypass flow in such high bypass ratio engines may be sufficient to obtain sufficient reversing necessary to meet specifications.

It is well understood that thrust reversers must perform two functions. They must stop the flow and they must turn the flow into the reverse direction. It is desired to do this where there is as little disturbance or change as possible in the normal aerodynamic members that are required for other engine functions.

In most of the present type thrust reversers, the aircraft geometry has been compromised to reflect the physical mass of the reverser unit. As stated above, it is desired to provide a reverser that will fit the aircraft structure as it exists for other aerodynamic functions. It is also important that a thrust reverser be fast operating for immediate and full thrust in the case of a wave off or go around condition during a landing operation. Also the reverser must not interfere with the operation of the engine by causing overspeed or stalling when actuated. In other words, it is desirable that the engine be kept operating at its full rotating speed and that the thrust reverser be able to move quickly from the forward to reverse position and back again without changing the loading of the fan or gas generator. Furthermore, the thrust reverser should be fail safe so that it will stay in the reverse thrust position in the event of structural failure while the reverser is being used as a landing roll reverser. Also, if a control system failure should occur with the reverser in the stowed or in a partial reverse thrust position the mechanism should lock and prevent further motion.

The main object of the present invention is to provide a thrust reverser that is applicable to high bypass ratio turbofan engines and which splits the functions of the thrust reverser both functionally and structurally.

A further object is to provide such a reverser which employs substantially the existing fan structure with minimum comprising of any of the aerodynamic characteristics desired for other functions.

A further object is to provide a reverser wherein the blocking flaps are disposed upstream of the throat so that any pressure losses are in the low velocity section and minimized.

Another object is to provide such a reverser in which the use of fixed cascades are employed so that the large pressure loads imposed on the engine structure may be taken by the heavy fixed frame-type structure normally present.

A further object is to provide such a reverser wherein the fixed cascade structure is employed with an intermediate cowling portion that operates in conjunction with blocker flaps that close the bypass duct and are linked to an inner wall in such a manner as to reduce the loads on the actuating means by an order of magnitude.

A further object is to provide such a reverser wherein the blocker flaps perform the dual function of an inner flow surface as well as a cover for the cascades in the cruising position. Suitable seals are used between the blocker flaps that also provide the dual functions of a flow surface and sealing means.

Briefly stated, the invention is directed to use in a jet propulsion powerplant of the front fan high bypass ratio type having an inner wall and a fan concentric therewith and extending radially beyond the wall. This may be an aft or forward fan engine when the wall encloses an engine. A thrust reverser mechanism is provided in a cowling surrounding the fan and spaced from the wall to form a bypass duct. The cowling is split to have axially spaced fixed forward and aft portions which are substantially cylindrical and form an opening therebetween. These portions provide inner and outer flow surfaces for cruise operation. A translatable intermediate cowling portion is provided to cover the opening and form a smooth outer flow surface with the fixed portions. A fixed ring of flow reversing cascades is disposed in the opening between the fixed portions. There is provided an actuation ring connected to and movable with the translatable cowling portion to telescope it over the downstream portion. Reversing is obtained by a plurality of peripherally disposed blocker flaps that are pivoted at their upstream ends to the actuation ring. The flaps form part of the inner flow surface of the duct and also close the opening under the cascades. The reverser is operated by actuating means which are disposed in the fixed forward portion and connected to the actuating ring to translate the ring, the intermediate cowling portion, and the flaps downstream. A link is connected to each flap and the inner wall to pull the flaps into substantial edge abutment with each other and block the duct to reverse the duct flow. Reduction of undesirably high loading forces is obtained by pivoting the links downstream of the center of pressure of the flap to further coact with the fixed cascade in transmitting the loads to substantial frame portions and thus minimize the actuator size and weight. By making the fixed downstream portion of smaller diameter a convergent nozzle is formed. The edges of the blocker flaps are provided with floating seals and predetermined gaps so that there is substantial abutment in the blocking position and the seals and flaps for an innner flow surface as well as an inner cover over the cascade opening.

Figure 4:
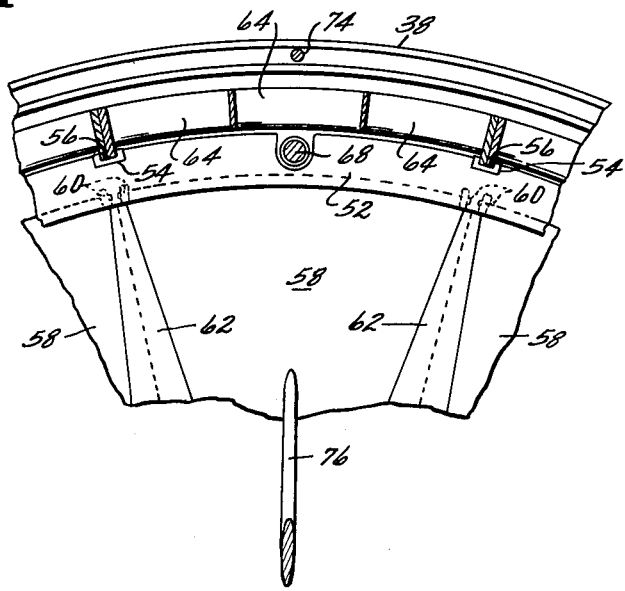

While the specification concludes with claims particularly pointing out and distinctly claiming the subject matter which is regarded as the invention it is believed that the invention will be better understood from the following description taken in connection with the accompanying drawings in which:

FIGURE 1 is a plan view of a typical front fan powerplant supported from an aircraft wing and employing the instant invention, FIGURE 2 is an enlarged cross-sectional view in the area of the reverser showing the reverser mechanism in cruise position with the primary elements dotted in the reverse thrust position, FIGURE 3 is a partial perspective view omitting some parts for clarity and showing the thrust reversing mechanism in reversing position, and FIGURE 4 is a partial cross-sectional view on lines 4—4 of FIGURE 3 illustrating a typical guide arrangement for the actuation mechanism.

It should be understood that the front fan high bypass ratio powerplant is described for illustration and the invention is equally applicable to aft fan powerplants as well as cruise fans. Also, the invention is described in connection with a front fan powerplant with a concentric jet engine wherein the fan cowling does not extend completely back to the rear of the jet engine wall although the invention is equally applicable to such an installation. High bypass ratio fans are those in which the ratio of the fluid passing through the fan to the jet engine may be as high as 8 to 1 or above. In such installations it may be necessary to reverse only the fan flow for satisfactory performance and the jet engine exhaust may be ignored.

Referring first to FIGURE 1, there is shown a front fan powerplant of the general type that might employ the instant invention. To this end, an aircraft structure such as wing 10 may support an engine generally indicated at 12 by means of a conventional strut or pylon structure 14. Engine 12 may be of the front fan concentric type as shown in FIGURE 1 which employs an inner jet engine 16 discharging through a nozzle 18 to provide thrust. The jet engine is enclosed within a wall 20 in the conventional manner. While described in connection with a concentric fan jet engine it should be noted that wall 20 may be the wall of a plug in a pure cruise fan fed from a remote gas generator in a well known manner. For convenience of description, the concentric arrangement will be described.

In order to provide additional thrust in the well known manner, a fan 22 concentric with the engine and extending radially beyond the wall 20 is provided. The fan 22 is surrounded by cowling 24 which is larger in diameter than the engine and spaced from the engine wall 20 to form a bypass duct 26 for additional thrust by movement of relatively large masses of lower velocity air in the well known manner. As explained above, in the high bypass ratio type powerplant this mass of air may be as high as eight or greater times the amount of airflow through the engine 16. The fan air is thus used to propel fluid through the duct 26 as well as to supercharge the engine 16.

In order to provide a simplified and lightweight reverser for the fan structure and bypass flow it is advantageous to make direct use of the cowling 24 as part of the reverser mechanism. At the same time, it is desired that cowling 24 be kept as thin as possible for desired aerodynamic reasons. For this reason, and to avoid compromising the physical characteristics of the engine geometry, the present invention splits the reverser functionally and structurally.

The two functions that a reverser must perform are (1) stopping the flow and (2) turning the flow. The present invention provides structure to perform both of these functions and splits the structure so that two separate but interconnected systems primarily disposed within the cowling perform the two functions and still maintain any disturbance of the aerodynamic features of the engine at a minimum. Additionally any minor disturbance is conveniently maintained upstream of the nozzle throat in the subsonic flow region where the pressure losses are minimized.

The present invention is an improvement on co-pending application Serial No. 462,790 filed June 7, 1965 and assigned to the same assignee. The prior application locates all of the mechanism in the outer cowl and maintains a two-part cowl structure. The present invention uses a different cowl structure and reduces the loads imposed on the prior structure by putting a small part of the actuation mechanism in the form of links in the fan stream. The desirable feature of a fixed cascade to permit the heavy loads imposed thereon to be transmitted to fixed framelike structure is provided.

Referring next to FIGURES 2 and 3, it will be seen that the cowling 24 includes a forward fixed portion 28 and an aft fixed portion 30 both of which are normally cylindrical. The axial spacing of portions 28 and 30 provides an opening 32 between the portions for a purpose to be described. In order to provide an aerodynamically smooth cowling structure in cruise position, the forward cowling portion 28 in conjunction with inner surface 34 forms a flow surface and the aft fixed portion 30 itself provides both inner and outer flow surfaces as shown. Conveniently, the aft end of fixed portion 30 may form the throat 36 of a convergent nozzle with wall 20.

In order to provide access to opening 32 through which fluid flow will pass during reverse thrust, there is provided a translatable intermediate cowling portion 38 of suitable axial length which may conventionally be of hollow thin skin structure for lightweight and formation of smooth flow surfaces. In the closed position shown in FIGURE 2, intermediate portion 38 forms a smooth continuous flow surface with the forward and aft fixed portions 28 and 30 respectively. Sealing means 40 may be supplied at each end of the opening in any suitable manner and conveniently may be designed to be squeezed between the portions during cruise operation as will be apparent in FIGURE 2.

Because of the heavy loads imposed during reverse thrust, it is desirable that substantial structural members be used as much as possible. To this end, the forward fixed portion 28, as part of the substantial structural frame has a fixed flange 42 that may be in the form of a disc which has bolted thereto an angled extension 44 for strength and which in turn is supported by a cone member 46 from the front flange 48 of the fan stator assembly. In other words, this is the basic fixed supporting structure through which the loads are to be taken. The whole outer cowling assembly is then supported from the central engine or wall 20 through struts 50 as appropriate.

Thus far described, there is provided a structure of a forward 28 and aft 30 fixed cowling with an intermediate opening 32 and translatable cowling portion 38. The fixed structure is carried on the large sturdy fan stator assembly 46, etc., to provide a substantial rigid and lightweight construction.

In order to reverse the flow through duct 26 it is necessary first to block the flow. To this end, there is provided an actuation ring 52 that is designed to move aft from the position shown in FIGURE 2 to the dotted position therein and as shown in FIGURE 3. Ring 52 may be held in position by any suitable guide means 54 as best seen in FIGURES 3 and 4. This may consist of nothing more than a track-like structure along the edge of the opening on suitable beams 56. For closing the bottom of opening 32 there is provided a plurality of blocker flaps 58 that are connected as by pivots 60 at their upstream ends to actuation ring 52 and are peripherally disposed around ring 52. As seen in FIGURE 2, they are shaped to form part of the inner flow surface of duct 26 under the cascades in the cruise position. The upstream pivot 60 of the blocker flaps on ring 52 is thereby caused to move with the ring. Inasmuch as the flaps are designed to be pulled or forced inward in fully extended position to block the duct 26, they must be of semi pie shape to abut or contact the wall 20 in the blocked position. For this purpose, the flaps are designed to substantially abut along their edges with a predetermined gap between adjacent flaps for movement across the duct. Of course, in the area of pylon 14 two special flaps of special shape will be required. Suffice to say, suitable floating seals 62 carried by flaps 58 to move relative to the flaps are provided as seen in FIGURE 4. In both open and closed positions the blocker flaps may be held in position by air pressure alone. Any suitable track arrangement may be used to carry the seals on the flap and in the closed cruise position the seals with flaps form the remainder of the smooth inner flow surface.

Having provided means to block the flow it is then necessary to reverse it. To this end, there is provided a ring of flow reversing cascades 64 that may be set in the opening in segments or sections around the periphery of the cowling in said opening. As will be seen in FIGURE 3, these cascades are uncovered upon translating movement of intermediate cowl portion 38 from abutment with the forward portion 28.

In order to move the parts there is provided a suitable arrangement such as an actuating means 66 within the forward fixed portion 28 which may include a jack screw 68 that is turned by internal gear or air turbine mechanism. Actuator 66, in turn, is connected through the jack screw to actuation ring 52 as shown. The translatable cowl portion 38 is also interconnected by means of the actuator, through its jack screw, operating bracket 70 which is guided in guide means 72 provided in the forward fixed portion and a rod 74 connected to bracket 70 and portion 38 as shown. It will be appreciated that any suitable interconnecting linkage may be used so that the translatable portion 38 and the blocker flaps 58 move substantially in unison and the specific structure shown is intended to be typical.

It will be apparent that the high reverse thrust loads imposed on cascades 64 are thus transmitted through the cowling and struts 50 to the solid portion of the engine as represented by wall 20. The smaller diameter fixed aft portion 30 permits translatable portion 38 to slide relative to it and over it in concentric telescopic relation as shown in FIGURE 2 to open up the cascades.

In order to reduce the heavy duty actuating structure that may be required due to high loads on the blocker flaps when they are in blocking position as shown in FIGURE 3, there is provided a link 76 connected to each flap and wall 20 to pull or guide the flap inward into substantial edge abutment and end abutment on wall 20 upon translation of actuating ring 52. A suitable circular section 78 may cooperate with a corresponding opening in wall 20 to minimize the aerodynamic disturbance. Naturally links 76 are suitably streamlined to present minimum aerodynamic drag during cruise operation.

In order to reduce further the loads and provide some balancing, the links 76 are preferably pivotally connected downstream of the center of pressure 80 of each flap as shown in FIGURE 3. This provides a horizontal force component in the upstream direction to oppose that in the downstream direction on actuating ring 52 to cancel some of the load on the ring.

It will be apparent that the reverser thus described, with its fixed cascade, imposes the heavy loads on substantial frame structure where it can be taken. The additional loading on the blocker flap is eased and can be used to balance some of the load on the actuation ring by the off-center pivoting of links 76. This is enhanced by the shallow angle that links 76 make with wall 20 in the dotted position of FIGURE 2 and this is kept as small as possible in order to obtain the maximum balancing force to offset the load on actuating ring 52. Furthermore, the presence of links 76 permits reduction in size and weight and number of actuating means 66. Normally, a plurality of actuating means 66 will be used at several stations around the periphery. Locating the flaps 58 upstream of the nozzle throat 36 ensures that any pressure losses that might occur are in the subsonic velocity or lower pressure region where they can be minimized. Conveniently, the reverser may operate very fast as a two-position on-off reverser or can be scheduled, if appropriate to operate at intermediate positions.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. In a jet propulsion powerplant of the fan type having an inner wall and a fan concentric therewith and extending radially beyond said wall, thrust reverser mechanism comprising,
   a cowling surrounding said fan and spaced from said wall to form a bypass duct,
   said cowling having fixed forward and aft portions forming an opening therebetween and a translatable intermediate portion adapted to cover said opening and form a smooth outer surface with said fixed portions,
   a fixed ring of flow reversing cascades disposed within said opening,
   an actuation member connected to and movable with said translatable portion,
   a plurality of peripherally disposed blocker flaps connected to said member and forming part of the inner flow surface of said duct under said cascades,
   actuating means disposed within said cowling and connected to said actuating member for translation downstream, and
   link means connected to said flaps and said wall for guiding said flaps into duct blocking position for reversing the duct flow.

2. Apparatus as described in claim 1 wherein guide means are provided in said forward fixed portion and said actuating means has interconnection with said guide means and said translatable portion to operate said translatable portion from closed abutment with said fixed forward portion to open telescoped position over said aft fixed portion.

3. Apparatus as described in claim 1 wherein strut means is provided connected to said wall upstream of said flaps for support of said cowling and transmission of thrust reverse loads through said cowling to said wall.

4. Apparatus as described in claim 1 wherein said aft fixed portion and wall form a nozzle.

5. Apparatus as described in claim 1 wherein said blocker flaps are formed with predetermined gaps therebetween during movement across said duct to substantially abut each other along the edges in fully extended position touching said wall.

6. Apparatus as described in claim 1 wherein said link means are connected to said flaps downstream of the center of pressure of said flaps.

7. In a jet propulsion powerplant of the front fan high bypass ratio type having an inner wall and a fan concentric therewith and extending radially beyond said wall, a thrust reverser mechanism comprising,
   a cowling surrounding said fan and spaced from said wall to form a bypass duct,
   said cowling having axially spaced fixed forward and aft substantially cylindrical portions forming an opening therebetween and providing inner and outer flow surfaces in cruise position,
   a translatable intermediate cowling portion adapted to cover said opening and form a smooth outer flow surface with said fixed portions,
   a fixed ring of flow reversing cascades disposed in said opening,
   an actuation ring connected to and movable with said translatable portion,
   a plurality of peripherally disposed blocker flaps pivoted at their upstream ends to said ring and forming part of the inner flow surface of said duct and closing said opening under said cascades,
   actuating means disposed in said fixed forward portion and connected to said actuating ring for translation downstream, and a link connected to each flap and said wall for guiding said flaps into edge abutment with each other and block said duct for reversing the duct flow.

8. Apparatus as described in claim 7 wherein said aft fixed portion is of smaller diameter than said intermediate portion for concentric movement therebetween.

9. Apparatus as described in claim 8 wherein guide means are provided in said forward fixed portion and said actuating means has interconnection with said guide means and said translatable portion to move said translatable portion from closed abutment with said fixed forward portion to open telescoped position over said aft fixed portion.

10. Apparatus as described in claim 8 wherein strut means is provided connected to said wall upstream of said flaps and to said forward fixed portion for support of said cowling and transmission of thrust reverse loads through said cowling to said wall.

11. Apparatus as described in claim 8 wherein said aft smaller diameter fixed portion and wall form a convergent nozzle.

12. Apparatus as described in claim 8 wherein said blocker flaps are formed with predetermined gaps therebetween during movement across said duct to substantial edge abutment in fully extended position to contact said wall.

13. Apparatus as described in claim 8 wherein said blocker flaps are formed with predetermined gaps therebetween and floating seal means is provided between the edges of said flaps and carried thereby to move relative thereto to seal in blocking position and form the other part of the inner flow surface with said flaps to close said opening under said cascades.

14. Apparatus as described in claim 8 wherein said links are connected to said flaps downstream of the center of pressure of said flaps.

References Cited by the Examiner

UNITED STATES PATENTS

| | | | |
|---|---|---|---|
| 2,841,956 | 7/1958 | Gunson et al. | 60—35.54 |
| 2,847,823 | 8/1958 | Brewer | 60—35.54 |
| 2,945,346 | 7/1960 | Arnzen | 60—35.54 |
| 3,002,342 | 10/1961 | Schatzki | 60—35.54 |
| 3,034,296 | 5/1962 | Keen et al. | 60—35.54 |
| 3,036,431 | 5/1962 | Vdolek | 60—35.54 |
| 3,068,646 | 12/1962 | Fletcher | 60—35.54 |
| 3,113,428 | 12/1963 | Colley | 60—35.54 |

FOREIGN PATENTS 955,518  4/1964  Great Britain.

MARK NEWMAN, *Primary Examiner.*

C. R. CROYLE, *Assistant Examiner.*